United States Patent [19]

Grotz, Jr.

[11] Patent Number: 5,114,694

[45] Date of Patent: May 19, 1992

[54] AMMONIA RECOVERY FROM PURGE GAS

[75] Inventor: Bernard J. Grotz, Jr., Pasadena, Calif.

[73] Assignee: C. F. Braun & Co., Alhambra, Calif.

[21] Appl. No.: 503,266

[22] Filed: Apr. 2, 1990

[51] Int. Cl.$^5$ .............................. C01C 1/00; C01C 1/04
[52] U.S. Cl. ....................................... 423/352; 423/359
[58] Field of Search ................................ 423/359, 352

[56] References Cited

U.S. PATENT DOCUMENTS

| | | | |
|---|---|---|---|
| 1,664,997 | 4/1928 | Slade et al. | 423/359 |
| 1,679,792 | 8/1928 | Slade et al. | 423/359 |
| 1,849,357 | 3/1932 | Pyzel | 423/359 |
| 1,875,926 | 9/1932 | Hughes | 423/359 |
| 1,931,678 | 10/1933 | Porter | 423/361 |
| 1,938,598 | 12/1933 | Loud | 423/361 |
| 3,675,434 | 7/1972 | Crawford et al. | |
| 4,055,627 | 10/1977 | Guadalupi | |
| 4,149,857 | 4/1979 | Volke et al. | |
| 4,153,673 | 5/1979 | Becker | 423/359 |
| 4,172,885 | 10/1979 | Perry | 423/359 |
| 4,624,841 | 11/1986 | Hidaki | 423/359 |

FOREIGN PATENT DOCUMENTS 2065942  6/1977  Fed. Rep. of Germany.

OTHER PUBLICATIONS

Chemical Abstracts, vol. 102, No. 12, Mar. 1985 Columbus, Ohio U.S.A. M. Mrowiec et al.: "Multistage isothermic absorber for ammonia absorption", p. 110; ref. No. 97712 U.

Primary Examiner—Wayne Langel
Attorney, Agent, or Firm—Lyon & Lyon

[57] ABSTRACT

A continuous process for recovering ammonia from a purge gas of an ammonia synthesis system wherein the purge gas is scrubbed by an aqueous liquid solution in counter-current flow with continuous cooling which is controlled to maintain temperature levels safely above the freezing point and to produce an aqueous solution of high ammonia concentration which is mixed with an anhydrous ammonia product of the ammonia synthesis system to form a blended ammonia product with a minimum water concentration high enough to provide corrosion protection to carbon steel storage equipment and a maximum water concentration low enough to meet a maximum design specification for the concentration of water in the blended ammonia product.

20 Claims, 2 Drawing Sheets

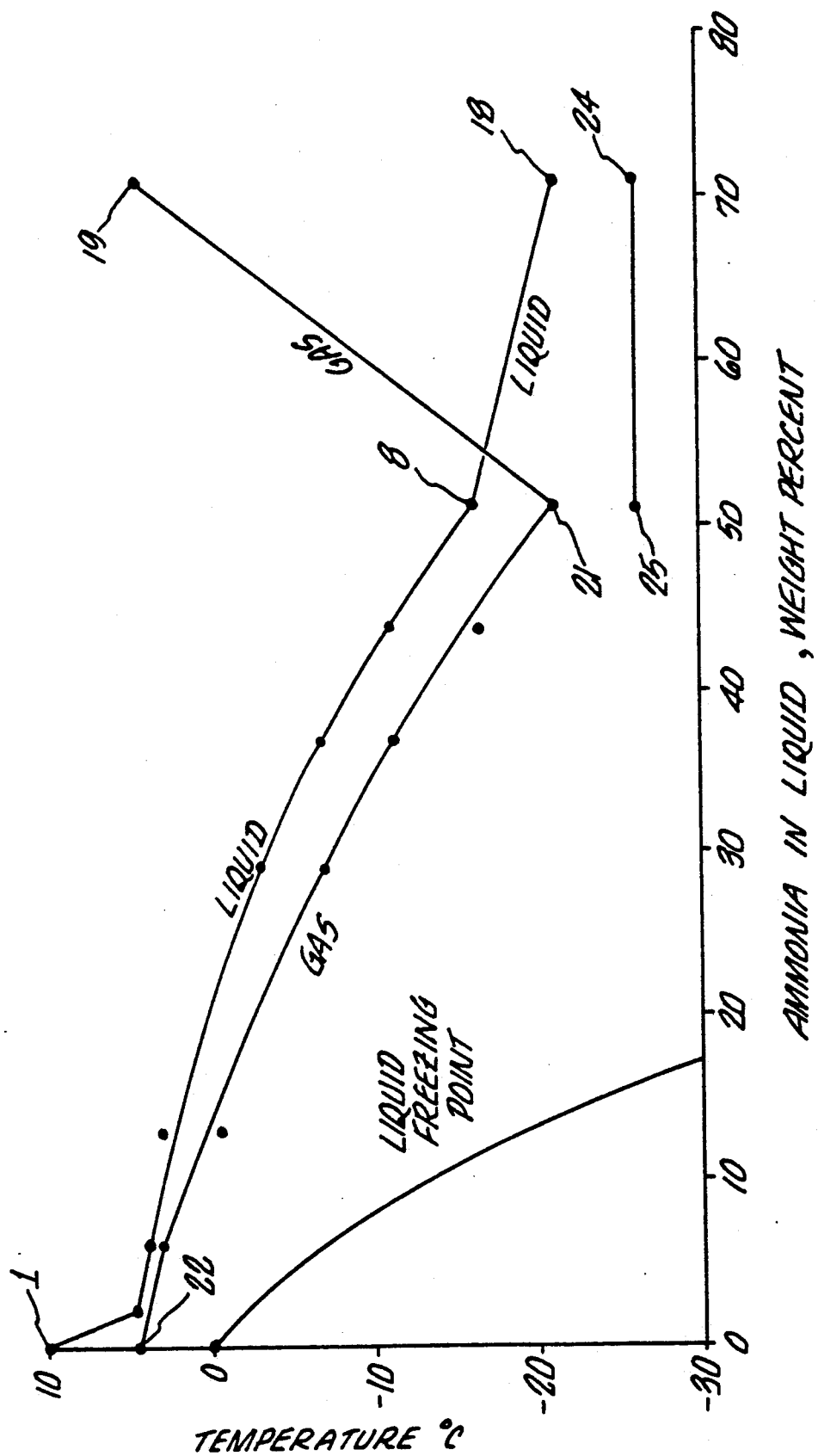

AMMONIA RECOVERY FROM PURGE GAS

BACKGROUND OF THE INVENTION

1. Field of the Invention

The field of the invention relates to the manufacture of ammonia. More particularly, the field of the invention relates to a novel continuous process for the recovery of ammonia from the purge gases of an ammonia manufacturing plant in the form of an aqueous solution, with the concentration of water in the solution controlled within a narrow range that permits the solution to be blended into the main anhydrous ammonia product of the plant to give a water content in the product which is high enough to provide corrosion protection to carbon steel product storage equipment, but which is still low enough to avoid exceeding the maximum specification for water in the shipped product.

2. Description of the Related Art

Many processes are known for the manufacture of ammonia. A number of such processes are described in the book titled "Ammonia", edited by A. V. Slack and G. R. James, published by Marcel Dekker, 1977. A typical process, the Chemico ammonia process, is shown in Part III, page 303, FIG. 3 of that reference. In the Chemico process, as in most commercial processes, ammonia is synthesized from a mixture of hydrogen and nitrogen at an elevated pressure and temperature in an ammonia converter. Because of equilibrium limitations, only part of the hydrogen and nitrogen are converted to ammonia in a single pass through the converter. The gas leaving the converter is cooled in a series of heat exchangers to temperatures at which most but not all of the ammonia formed is liquified and then separated from the unconverted gas in the primary and secondary separators. The unconverted gas is combined with fresh makeup feed gas containing hydrogen and nitrogen and then recycled to the converter.

Makeup gas normally contains inert gaseous impurities, such as methane and argon, which do not react. Such inerts tend to accumulate in the circulating gas, reducing the partial pressures of the hydrogen and nitrogen, thereby suppressing the conversion of hydrogen and nitrogen to ammonia. To limit the concentration of inerts in the circulating gas to a tolerable level, some of the recycle gas is withdrawn as a purge stream. In the Chemico process cited above purge gas is withdrawn from the circulating gas stream leaving the primary separator.

In the Chemico process the purge gas is used for fuel in the primary reformer. Because purge gas withdrawn from a recycle stream contains a residual amount of ammonia vapor not condensed from the reactor effluent, it is desireable to recover that ammonia vapor as a valuable increment of production. In the Chemico process part of the ammonia in the purge gas is recovered by chilling the gas with ammonia refrigerant to a still lower temperature, at which additional ammonia is condensed and then separated from the purge gas in another separator.

Liquid ammonia separated from converter effluent contains a small amount of dissolved gases. When the liquid is reduced in pressure from reaction pressure to a lower storage pressure, as in the Chemico process, most of the dissolved gases flash out of the liquid into a gaseous phase. This gas also contains a small amount of ammonia vapor which it is desireable to recover. Such flash gas is normally combined with the purge gas as in the Chemico process. As used herein, the term purge gas refers to any gaseous stream or streams withdrawn from ammonia synthesis reactor effluent streams, before or after combining with fresh makeup feed gas and before or after any cooling, liquefaction, compression, pressure reduction, or vapor-liquid separation step.

Two principal means have been used to increase the recovery of ammonia from purge gas. One is to cool or refrigerate the purge gas to a lower temperature, at which additional ammonia is condensed and separated, as in the Chemico process. One disadvantage of this method is that the additional refrigeration requires additional investment and consumes additional energy, increasing costs, and it still leaves part of the ammonia in the purge gas. Another disadvantage, when the purge gas is to be used as fuel, is that the residual ammonia tends to increase the level of environmentally objectionable nitric oxides in the combustion gases discharged to the atmosphere.

In some ammonia manufacturing processes the purge gas is further processed in a cryogenic or membrane separation system to separate and recover the hydrogen and nitrogen for recycle, or to recover other valuable components such as argon. In such cases any residual ammonia must be completely removed ahead of the cryogenic or membrane system, so that refrigeration alone is not an acceptable means of recovering the ammonia such cases.

The other principal means for increasing the recovery of ammonia from purge gas is to scrub the gas with water, which absorbs the ammonia to produce an aqueous solution of ammonia. Disadvantages of the water absorption method as practiced heretofore are that the ammonia solution that is recovered contains too much water to blend back into the anhydrous ammonia product, and is of value only if there is a local use for such a solution, as in an ammonium nitrate plant.

If there is no such use, then an additional system to fractionate the solution to recover the contained ammonia in anhydrous form is normally employed, increasing investment costs and energy cost. Such a system is described in an article titled "25 years of purge gas recovery", by W. H. Isalski, published in "Nitrogen", No. 152, pages 100–105, and shown in FIGS. 2 and 3 of the article.

With or without fractionation of the aqueous solution, the concentration of ammonia in the aqueous solution has been limited to a level at which the aqua can be stored at atmospheric pressure when cooled to a temperature which can be achieved with ordinary cooling water. Such a concentration level generally falls in the range of 20 to 25 weight percent.

A heretofore unrelated factor is that anhydrous ammonia which contains no water at all is known to be more corrosive to carbon steel storage equipment than ammonia which contains a small concentration of water, greater than 0.1%, preferably about 0.2 wt %. This factor has been unrelated to ammonia recovery from purge gas, because when the refrigeration method is used for recovery of ammonia from purge gas, no water is present in the recovered ammonia. And when a conventional water scrubbing method is used, the amount of water in the recovered ammonia is far greater than that required for corrosion protection, and far greater than that allowed by most commercial specifications for ammonia product, ranging from 0.1 to 1.0 wt % water and typically in the range 0.2 to 0.5 wt % water.

When ammonia is absorbed in water, heat is evolved, heating the solution to a temperature higher than that of the water used for absorption. Higher temperatures reduce the concentration of ammonia that can be reached with a given ammonia partial pressure in the incoming gas. To increase the concentration of ammonia in the aqueous solution, heat is sometimes removed by indirect heat exchange with cooling water within the absorber or between two or more absorption stages.

The use of a refrigerant in combination with water scrubbing has heretofore been avoided because of the extra costs mentioned above, because aqueous solutions of higher concentrations than can be achieved with cooling water cannot be stored at atmospheric pressure, and because of the risk of chilling the water or dilute solution below its freezing point somewhere in the absorption system, causing plugging and shutdown.

The need exists, therefore, for a continuous process for recovering ammonia from ammonia plant purge gases which provides for essentially complete recovery, which provides a water concentration in the total plant product which meets the requirements of both corrosion protection and product specifications, which avoids any freezing or plugging in the recovery system, and which provides all of these efficiently and at minimum investment and operating costs.

SUMMARY OF THE INVENTION

In the present invention, ammonia is recovered from purge gas by absorption with water to form an aqueous solution of high ammonia concentration, which is then combined with the main product stream of anhydrous ammonia. The invention makes this possible by providing for control of the ammonia concentration at a high level within the narrow range that is high enough to provide corrosion protection for carbon steel equipment and low enough to meet the specification for maximum allowable water in the anhydrous ammonia product.

The purge gas is first fed through a gas distributor into the lower part of a vessel in which a liquid level of aqueous solution of ammonia is maintained above the distributor. The liquid in the vessel is continuously cooled by means of a refrigerated tube bundle positioned inside the vessel above the gas distributor and at least partly submerged in the liquid.

The gas leaving the liquid is passed out the top of the vessel and brought into counter-current contact with scrubbing water, whereby the remainder of the ammonia in the gas is absorbed in the scrubbing water, forming a dilute ammonia solution which is then passed into the vessel. In the vessel itself, the dilute solution is refrigerated to a lower temperature and absorbs the bulk of the ammonia to produce an aqueous solution of high ammonia concentration, which is then mixed with the main anhydrous ammonia product of the plant.

Careful control of two important variables keep the water content of the final combined plant product within the desired limits and the temperatures at all points within the absorption system above the freezing point. First, the rate of the scrubbing water is controlled in relation to the purge gas rate, the ammonia concentration in the purge gas, and the total plant product rate, so that the water content of the total plant product will fall within the required range. Second, the temperature of at least one point in the process is controlled by operation of a cooling system to maintain temperature levels safely above the freezing point of any fluid in the counter-current absorption device at all points in the counter-current absorption device and in the vessel.

It is an object of this invention to provide a novel continuous process for the recovery of ammonia from the purge gases of an ammonia manufacturing plant.

It is also an object of this invention to provide a novel continuous process for the recovery of ammonia from purge gas in which the ammonia is recovered in the form of an aqueous solution of a concentration which allows the solution to be blended into the total plant product, resulting in a water concentration in the total plant product which satisfies the requirements of both corrosion protection and product specifications.

It is a further object of this invention to provide a novel continuous process for the recovery of ammonia from purge gas at low investment and energy costs in which recovery is essentially complete, while avoiding the necessity of an aqueous ammonia fractionation system, and also while avoiding any risk of freezing or plugging in the recovery system.

These and other objects, as well as the nature, scope and utilization of the invention, will become readily apparent to those skilled in the art from the following description, the drawings and the appended claims.

BRIEF DESCRIPTION OF THE DRAWINGS

FIG. 2 shows temperature profiles in the same embodiment of the invention illustrated in FIG. 1.

DETAILED DESCRIPTION OF THE INVENTION

Figure 1:
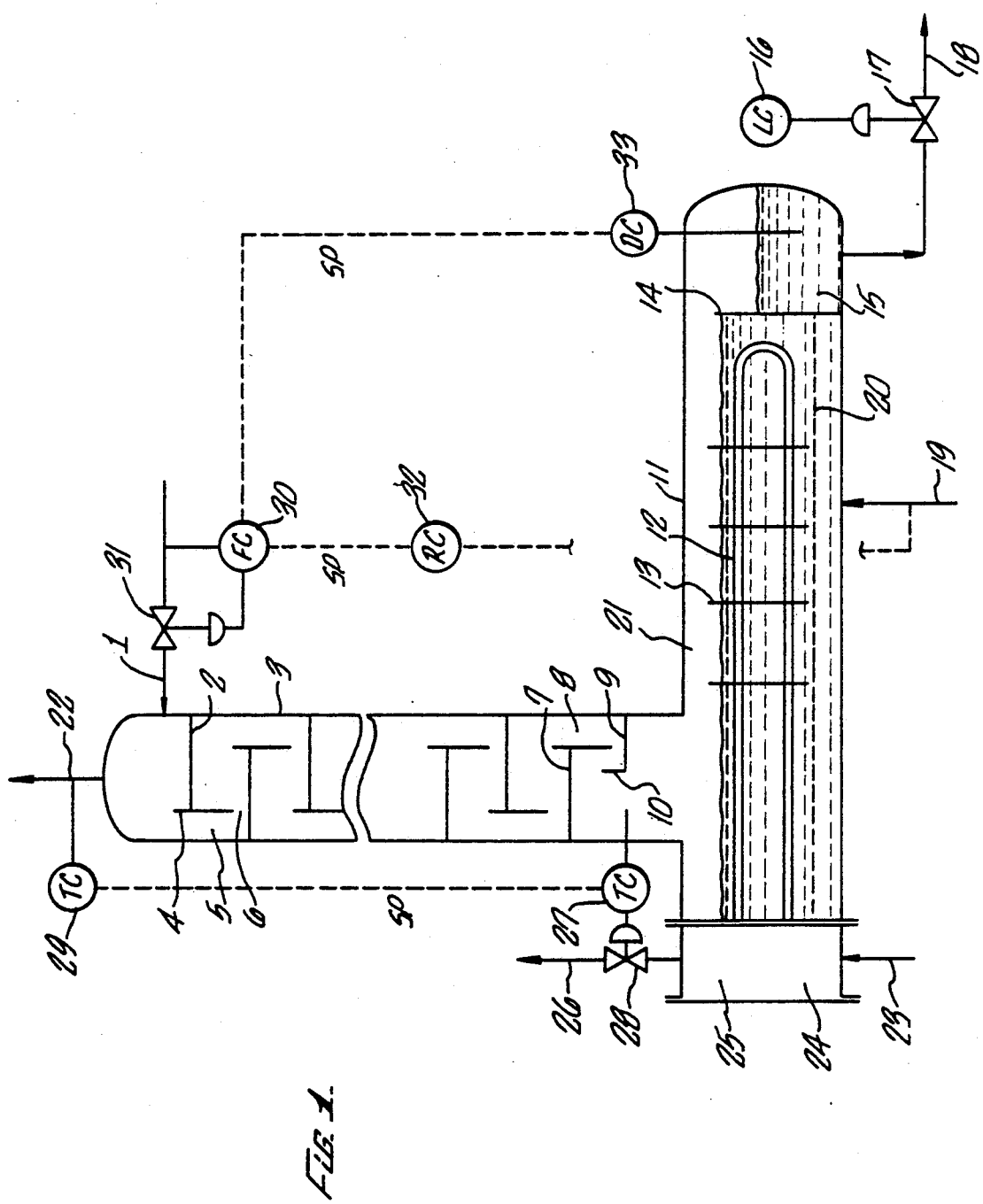
FIG. 1 shows a flow diagram representing an embodiment of the invention.

Referring to FIG. 1, a specific embodiment of the invention is described as follows. Liquid water having a temperature of about 10° C. is introduced at a rate of 146 Kg/hr. through a conduit 1 onto a top bubble cap tray 2 disposed within an absorber 3. The liquid then flows across tray 2 and over a weir 4, which maintains an appropriate liquid level on tray 2. The liquid then flows downward through a downcomer passage 5 onto the next tray below tray 2, under a seal 6, and across the second tray, then flowing in like manner across each succeeding tray in the absorber, finally leaving a bottom tray 7 through a downcomer passage 8 onto a seal pan 9, and overflowing a weir 10 into a vessel 11 containing a tube bundle 12.

The liquid then flows back and forth around segmental baffles 13 across tube bundle 12 and then over a weir 14 into a liquid surge chamber 15, weir 14 serving to maintain a liquid level above tube bundle 12. A level controller 16 operates a valve 17 to control the discharge of liquid through a conduit 18 to maintain a liquid level in surge chamber 15.

A purge gas having a pressure of 36 bar, a temperature of about 5° C. and an ammonia concentration of 5.3% by volume is introduced at a rate of 393 Kg-mol/hr through a conduit 19 into the lower part of cooler shell 11. The gas then flows upward through a perforated plate 20 having perforations sized and spaced to distribute the gas with approximate uniformity over the length and breadth of vessel 11.

The thus-distributed gas then bubbles upward through the reservoir of liquid, flowing past the tubes of tube bundle 12 and into a vapor space 21 above the reservoir of liquid at a temperature of about −21° C., thence into the lower end of absorber 3. Part of the ammonia is absorbed in the reservoir of liquid in vessel 11, leaving about 3.3 % by volume in the gas entering absorber 3. The gas then flows upward through bottom bubble cap tray 7, through each of the other bubble cap trays in succession, finally leaving top bubble cap tray 2 and thence the scrubbed gas is removed out of the top of absorber 3 through a conduit 22.

As the liquid flows downward and the vapor flows upward through absorber 3 and vessel 11, ammonia is transferred from the gas to the liquid, so that the scrubbed gas leaving in conduit 22 is virtually free of ammonia, and the ammonia removed is contained in the liquid leaving in conduit 18 is as an aqueous solution containing 70.7% ammonia by weight and having a temperature of about −21° C. The aqueous solution in conduit 18 is then mixed with the anhydrous ammonia product of the plant in a step not shown to form a blended ammonia product.

A cooling system uses indirect heat transfer from the mixture in the vessel of purge gas and the aqueous solution containing ammonia to a refrigerant. In this particular embodiment, liquid ammonia refrigerant is introduced through a conduit 23 into a cooler tube channel 24 and thence into the tubes of tube bundle 12. The refrigerant ammonia vaporizes at a temperature of about −26° C. as it passes through tube bundle 12, thereby removing heat from the liquid and vapor flowing through vessel 11. The refrigerant ammonia vapor leaving tube bundle 12 passes through a tube channel 25 and leaves the system through a conduit 26.

A temperature controller 27 operates a valve 28 in conduit 26 to continually adjust the flow of refrigerant ammonia through tube bundle 12 to control the temperature of the gas in the space below bottom tray 7 at about −21° C. The set point of temperature controller 27 is continually adjusted by a temperature controller 29 to control the temperature of the gas leaving the top of column 3 through conduit 22 at a temperature of about 4° C.

A flow controller 30 continually adjusts a valve 31 in conduit 1 to control the flow rate of water into the top of column 3. The set point of flow controller 30 is continually adjusted by a flow ratio controller 32 to maintain a ratio of the flow of water in conduit 1 to the flow of incoming purge gas in conduit 19 such that the blended ammonia product will have a water concentration between desired minimum and maximum water concentrations. As an alternative mode of operation, the set point of flow controller 30 may be continually adjusted by a liquid density controller 33, thereby controlling and maintaining the flow of water to absorber 3 at a rate which will result in a constant density in the aqueous ammonia solution leaving the system in conduit 18, which in turn maintain an approximately constant ammonia concentration in the aqueous solution such that the blended ammonia product will have a water concentration between desired minimum and maximum water concentrations.

The ratio set point of ratio controller 32 and/or the density set point of density controller 33 are adjusted from time to time to maintain a concentration in the anhydrous ammonia product of the plant at a desired level high enough for corrosion protection in the product storage equipment and low enough to meet product specifications.

FIG. 2 shows, in relation to the concentration of ammonia in the liquid at various points in the system, some of which are indicated by the same index numbers as in FIG. 1, temperatures of the liquid at those points, temperatures of the gas in contact with liquid at those points, freezing temperatures of the liquid at these points, and the refrigerant temperature, all when the system is operated according to the embodiment described above and shown on FIG. 1.

Referring to FIGS. 1 and 2 together, refrigerated tube bundle 12 removes sensible heat from both the gas entering vessel 11 through conduit 19 and the liquid entering vessel 11 from tray 7 and further removes heat generated by the absorption of ammonia in vessel 11, cooling both the gas leaving vessel 11 from vapor space 21 and the liquid leaving in conduit 18 to about −21° C.

As the gas from vapor space 21 passes upward through the column, its temperature rises. The heat for increasing the gas temperature comes mostly from the heat generated by the absorption of ammonia. Some of the sensible heat content of the water entering through conduit 1 is transferred to the rising gas in the column, thereby cooling the water, but providing only a small part of the heat which increases the gas temperature.

On the top tray of the column, where the water entering through conduit 1 first contacts gas from which most of the ammonia has been removed, the temperature of the water is rapidly reduced to a temperature approaching the temperature of the gas, because the mass of gas is much greater than the mass of water.

As a result of the aforementioned factors, the temperature of the gas at the top of the column depends primarily on the temperature and ammonia concentration of the gas entering tray 7 at the bottom of the column, and only to a very minor extent on the temperature of the water entering through conduit 1. The water quantity also has only a minor effect on the temperature of the gas leaving in conduit 22 so long as the quantity of water is sufficient to absorb the ammonia contained in the gas entering tray 7.

FIG. 2 shows that the closest approach of a liquid temperature to a liquid freezing point occurs at the top of the column. Since the liquid temperature at the top of the column, after its first contact with the gas, is determined primarily by the gas temperature, freezing can be prevented by careful control of the temperature of the gas leaving the top of the column. The control system described above and shown on FIG. 1 accomplishes this. The control system also adjusts both the refrigerant rate and the scrubbing water rate as the quantity of purge gas and the concentration of ammonia in the purge gas vary according to changes in plant operation.

Other embodiments of the invention include the following.

The preferred contacting devices in the column are bubble cap trays, preferably with leak proof joints for holding water on the trays with no gas flow, as during startup and shutdown. However, any of many other contacting devices known for such a purpose, including valve trays, sieve trays, random packing materials, or structured packing materials can be used. However, if a type of device is used which does not retain liquid with no gas flow, more careful startup and shutdown procedures are required to prevent high ammonia concentrations in the gas leaving the top of the absorber, which might cause problems in downstream equipment, and to ensure against freezing in the column.

The cooler located at the bottom of the absorber is any of the many such devices known for use in indirect heat transfer between fluids, preferably a shell and tube exchanger of any number of passes, more preferably with an even number of passes, and still more preferably with two passes as described in the example above.

The residual ammonia in the gas leaving the absorber is any concentration which is economic and permissible for the use to which the gas is to be put, preferably less than 0.1 volume percent, and more preferably less than 100 ppmv.

The ammonia concentration in the solution leaving the vessel 11 through conduit 18 is any level which, when the solution is blended with plant product ammonia, results in a water concentration in the product high enough to provide corrosion protection in the product storage equipment and low enough to meet product specifications, preferably in the range of about 50 to about 90 weight percent and more preferably in the range 70 to 80 weight percent.

The minimum water concentration of water in the blended ammonia product is preferably greater than about 0.1 weight percent and the maximum concentration of water in the blended ammonia product is less than about 1.0 weight percent. More preferably, the minimum water concentration in the blended ammonia product is greater than about 0.2 weight percent and the maximum concentration of water in the blended ammonia product is less than about 0.5 weight percent.

The temperature of the gas leaving the top of the column is any temperature above 0° C., preferably above 4° C., which maintains temperatures at each point in the system above the freezing point of the liquid at that point.

The temperature of the water entering the top of the column is any temperature above 0° C., preferably between 2° and 50° C.

The pressure of the system is any convenient pressure, preferably between the pressure at which the purge gas is available and the pressure at which the overhead gas is used, more preferably between 20 and 40 atmospheres.

The refrigerant is any convenient refrigerant available at a temperature level required to remove heat from the fluids in the heat exchanger, preferably liquid ammonia, and more preferably liquid ammonia vaporizing at a temperature between −33° C. and −5° C.

The primary temperature control point is anywhere in the system, preferably at or near the bottom of the column.

Either the temperature of the scrubbed gas removed from the counter-current absorption device or the temperature of the purge gas passing out of the vessel can be controlled to maintain temperature levels safely above the freezing point of any fluid in the counter-current absorption device at all points in the counter-current absorption device and in the vessel.

The primary temperature control set point may be reset by any manual or preferably automatic means, preferably by another temperature controller at another location in the system, preferably located at or near the top of the column.

The flow rate of the water to the top of the column is controlled by any manual or preferably automatic means which maintains the water concentration according to the criteria set forth herein, preferably with a flow controller.

The water flow controller may be reset by any manual or preferably automatic means, preferably with a ratio controller or a density controller as described in the example above.

At some combinations of lower temperature and lower ammonia concentrations in the purge gas, the refrigerated tube bundle and vessel can be omitted. In the embodiment described above, for example, if the purge gas entering through conduit 1 had a temperature of −21° C. and an ammonia concentration of 3.3% by volume, and the water requirement in the total plant product remains at 146 Kg/hr, then the tube bundle and vessel would not be required. In such an embodiment, the concentration of ammonia in the aqueous solution might be as low as about 40 percent.

A purge gas having a lower temperature, as described in the previous paragraph for example, may be provided by passing at least a part of the purge gas into an expander at approximately the pressure at which that part is available, expanding the gas to approximately the pressure of the counter-current absorption device, and extracting mechanical energy from the gas, possibly using it to perform useful work as for example in an electric power generator.

It will be readily apparent to those skilled in the art that still further changes and modifications in the actual implementation of the concepts described herein can readily be made without departing from the spirit and scope of the invention as defined by the following claims.

I claim:

1. A process for the recovery of ammonia from a purge gas of an ammonia synthesis system, comprising the steps of absorbing ammonia contained in the purge gas in water to form an aqueous solution by means of a cooling step and an absorption step, the aqueous solution being formed by contacting the purge gas with water in counter current flow through the cooling step and the absorption step, the cooling step comprising indirect heat exchange with a coolant fluid, at least part of the aqueous solution being blended with at least part of an anhydrous ammonia product from the ammonia synthesis system to form a blended product, the flow rate of the water to the process being controlled to maintain a water concentration in the blended product between a minimum concentration required to provide corrosion protection to carbon steel storage equipment, and a maximum concentration allowed under specifications of the blended product, and the temperature of at least one point in the process being controlled at a level which avoids freezing of liquid at any point in the process.

2. A process for the recovery of ammonia from a purge gas of an ammonia synthesis system, comprising the steps of absorbing ammonia contained in the purge gas in water to form an aqueous solution, the aqueous solution being formed by contacting the purge gas with water in counter current flow, at least part of the aqueous solution being blended with at least part of an anhydrous ammonia product from the ammonia synthesis system to form a blended product, the flow rate of the water to the process being controlled to maintain a water concentration in the blended product between a minimum concentration required to provide corrosion protection to carbon steel storage equipment, and a maximum concentration allowed under specifications of the blended product, and the temperature of at least one point in the process being controlled at a level which avoids freezing of liquid at any point in the process.

3. A continuous process of recovering ammonia from a purge gas of an ammonia synthesis system, comprising the steps of:

introducing the purge gas to a vessel containing a reservoir of an aqueous solution containing ammonia to absorb ammonia from the purge gas into the aqueous solution, which is cooled to produce an aqueous solution of high ammonia concentration which is removed from the vessel and mixed with an anhydrous ammonia product of the ammonia synthesis system to form a blended ammonia product with a minimum water concentration high enough to provide corrosion protection to carbon steel storage equipment and a maximum water concentration low enough to meet a maximum concentration of water in the blended ammonia product;

passing the purge gas out of the vessel and introducing it into a counter-current absorption device;

introducing liquid scrubbing water into the counter-current absorption device;

contacting the purge gas with the liquid scrubbing water in counter-current flow to form a scrubbed gas which is passed from the counter-current absorption device and a dilute ammonia solution which is collected in the vessel to form the reservoir of the aqueous solution containing ammonia;

removing the scrubbed gas from the counter-current absorption device;

controlling the rate at which liquid scrubbing water is introduced into the counter-current absorption device in relation to the rate of purge gas introduced into the counter-current absorption device, the concentration of ammonia in the purge gas and the rate of production of the anhydrous ammonia product of the ammonia synthesis system so that the blended ammonia product will have a water concentration between the minimum and maximum water concentrations; and controlling the temperature of at least one point in the process by operation of a cooling system to maintain temperature levels safely above the freezing point of any fluid in the counter-current absorption device at all points in the counter-current absorption device and in the vessel.

4. A process as recited in claim 3, wherein the cooling system comprises indirect heat transfer from the mixture in the vessel of purge gas and the aqueous solution containing ammonia to a refrigerant.

5. A process as recited in claim 3, wherein the temperature of the scrubbed gas removed from the counter-current absorption device is controlled to maintain temperature levels safely above the freezing point of any fluid in the counter-current absorption device at all pints in the counter-current absorption device and in the vessel.

6. A process as recited in claim 3, wherein the temperature of the purge gas passing out of the vessel is controlled to maintain temperature levels safely above the freezing point of any fluid in the counter-current absorption device at all points in the counter-current absorption device and in the vessel.

7. A process as recited in claim 3, wherein the liquid scrubbing water flow rate is adjusted automatically to control the density of the aqueous solution of high ammonia concentration such that the blended ammonia product will have a water concentration between the minimum and maximum water concentrations.

8. A process as recited in claim 3, wherein the liquid scrubbing water flow rate is adjusted automatically to control the ratio of the liquid scrubbing water flow rate to the purge gas flow rate such that the blended ammonia product will have a water concentration between the minimum and maximum water concentrations.

9. A process as recited in claim 3, wherein the concentration of ammonia in the aqueous solution of high ammonia concentration is within the range of 50 to 90 weight percent.

10. A process as recited in claim 3, wherein the concentration of ammonia in the scrubbed gas is less than 0.1 volume percent.

11. A process as recited in claim 3 wherein the minimum water concentration of water in the blended ammonia product is greater than about 0.1 weight percent and the maximum concentration of water in the blended ammonia product is less than about 1.0 weight percent.

12. A process as recited in claim 3 wherein the minimum water concentration of water in the blended ammonia product is greater than about 0.2 weight percent and the maximum concentration of water in the blended ammonia product is less than about 0.5 weight percent.

13. A continuous process for recovering ammonia from a purge gas of an ammonia synthesis system, comprising the steps of:

introducing liquid scrubbing water into a counter-current absorption device;

introducing the purge gas into the counter-current absorption device;

contacting the purge gas with the liquid scrubbing water in counter-current flow to transfer ammonia contained in the purge gas to the liquid scrubbing water to form an aqueous solution containing ammonia and a scrubbed gas;

removing the scrubbed gas from the counter-current absorption device;

removing the aqueous solution from the counter-current absorption device and mixing it with an anhydrous ammonia product of the ammonia synthesis system to form a blended ammonia product with a minimum water concentration high enough to provide corrosion protection to carbon steel storage equipment and a maximum water concentration low enough to meet a maximum concentration of water in the blended ammonia product;

controlling the rate of liquid scrubbing water introduced into the counter-current absorption device in relation to the rate of purge gas introduced into the counter-current absorption device, the concentration of ammonia in the purge gas and the rate of production of the anhydrous ammonia product of the ammonia synthesis system so that the blended ammonia product will have a water concentration between the minimum and maximum water concentrations; and controlling the temperature of at least one point in the process by operation of a cooling system to maintain temperature levels safely above the freezing point of any fluid in the counter-current absorption device at all points in the counter-current absorption device.

14. A process as recited in claim 13, comprising the further step of passing at least part of the purge gas through an expander to extract mechanical energy, thereby lowering the temperature of the purge gas, before introducing the purge gas into the counter-current absorption device.

15. A process as recited in claim 13, comprising the further steps of collecting a portion of the aqueous solution in a vessel where it is cooled and absorbs ammonia from the purge gas to form an aqueous solution of high ammonia concentration which is used to form the blended ammonia product.

16. A process as recited in claim 15, wherein the concentration of ammonia in the aqueous solution of high ammonia concentration is within the range of 50 to 90 weight percent.

17. A process as recited in claim 13, wherein the concentration of ammonia in the aqueous solution mixed with the anhydrous ammonia product is greater than 40 weight percent.

18. A process as recited in claim 13, wherein the concentration of ammonia in the scrubbed gas is less than 0.1 volume percent.

19. A process as recited in claim 13, wherein the minimum water concentration is greater in the blended ammonia product is greater than about 0.1 weight percent.

20. A process as recited in claim 13, wherein the maximum concentration of water in the blended ammonia product is less than about 0.5 weight percent.

* * * * *